Patented Feb. 24, 1942

UNITED STATES PATENT OFFICE 2,274,593

GLUCAMINE SALTS OF AMINO-PHENYL-STIBONIC ACID

Robert Ludovic Despois, Choisy-le-Roi, France, assignor to Societe des Usines Chimiques Rhone-Poulenc, Paris, France, a company of France No Drawing. Application March 23, 1938, Serial No. 197,599. In Germany April 1, 1937

6 Claims. (Cl. 260—211)

The present invention relates to the preparation of new therapeutically useful antimony compounds derived from p-amino-phenyl-stibonic acid.

It is known that solutions of the salts of the aromatic stibonic acids can be stabilised by the addition of polyhydric alcohols, and also that p-amino-phenyl-stibonic acid yields salts with secondary amines.

According to the present invention it has been found that if the salts of amino derivatives of polyhydric alcohols, as for example, glucamine $$(CH_2OH-(CHOH)_4-CH_2-NH_2)$$

with p-amino-phenyl-stibonic acid are prepared, products are obtained in which the toxicity of the antimony is very much diminished in comparison with the salts of the simpler amines, as for example, diethylamine, which could not have been foreseen from a consideration of the known state of the art. Furthermore, it has been found that these new compounds are active trypanocides, whereas corresponding salts of diethylamine for example have hardly any action on these parasites (see for example Schmidt, Medizin und Chemie, I, p. 120).

According to the present invention, these new salts can be prepared for example by the action of an aqueous solution of the amino-derivatives of a polyhydric alcohol on p-amino-phenyl-stibonic acid and subsequent precepitation of the soluble compounds thus obtained by the addition of an organic solvent miscible with water. The salts thus obtained are stable in the dry state; this enables solutions to be made some time before their use and these solutions remain clear for a long time. These substances do not have any definite melting point, and decompose when heated to a high temperature. If hydrochloric acid is added to their aqueous solution and hydrogen sulphide passed into the solution, the solution becomes yellow in color and on heating, antimony sulphide is precipitated.

The following example illustrates how the invention can be carried out in practice, but the invention is in no way limited to this example:

Example

To an aqueous solution of a suitable quantity of glucamine there is added still moist freshly precipitated p-amino-phenyl-stibonic acid. On stirring, the stibonic acid quickly passes into solution and the solution is filtered and run little by little into a large quantity of absolute alcohol. If desired, acetone or dioxane or other precipitants for the salt which are miscible with water may be used. The precipitate thus produced is separated by filtration and washed with absolute alcohol and dried in a vacuum at a low temperature. There is thus obtained a salt very easily soluble in water and giving clear yellow solutions therein. By replacing the glucamine used in this example by N-methyl glucamine, the N-methyl salt is obtained in the same way as a substance likewise very soluble in water.

What I claim and desire to secure by Letters Patent is:

1. As a new chemical compound, the therapeutically active glucamine salt of p-amino-phenyl-stibonic acid.

2. As a new chemical compound the therapeutically active N-methyl glucamine salt of p-amino-phenyl-stibonic acid.

3. Therapeutically active compound of p-aminophenylstibonic acid and a member of the group consisting of glucamine $$(CH_2OH-(CHOH)_4-CH_2-NH_2)$$

and N-methyl-glucamine.

4. Process of preparing organic antimony compounds of therapeutic activity, comprising dissolving in water a member of the group consisting of glucamine $$(CH_2OH-(CHOH)_4-CH_2-NH_2)$$

and N-methyl-glucamine, adding moist freshly precipitated p-amino-phenyl-stibonic acid to the solution, stirring the resulting mixture, filtering, running the filtrate gradually into a large quantity of an inert organic water-miscible liquid, separating the resulting precipitate by filtration, washing the said precipitate with absolute alcohol, and drying the washed precipitate in vacuo at low temperature.

5. Process of preparing an organic antimony compound of therapeutic activity, comprising dissolving glucamine $$(CH_2OH-(CHOH)_4-CH_2-NH_2)$$

in water, adding moist freshly precipitated p-amino-phenyl-stibonic acid to the solution, stirring the resulting mixture, filtering, running the filtrate gradually into a large quantity of an inert organic water-miscible liquid, separating the resulting precipitate by filtration, washing the said precipitate with absolute alcohol, and drying the washed precipitate in vacuo at low temperature.

6. Process of preparing an organic antimony compound of therapeutic activity, comprising dissolving N-methyl-glucamine in water, adding moist freshly precipitated p-amino-phenyl-stibonic acid to the solution, stirring the resulting mixture, filtering, running the filtrate gradually into a large quantity of an inert organic water-miscible liquid, separating the resulting precipitate by filtration, washing the said precipitate with absolute alcohol, and drying the washed precipitate in vacuo at low temperature.

ROBERT LUDOVIC DESPOIS.